United States Patent
Suciu et al.

(10) Patent No.: US 10,723,470 B2
(45) Date of Patent: Jul. 28, 2020

(54) AFT FAN COUNTER-ROTATING TURBINE ENGINE

(71) Applicant: UNITED TECHNOLOGIES CORPORATION, Farmington, CT (US)

(72) Inventors: Gabriel L. Suciu, Glastonbury, CT (US); Jesse M. Chandler, South Windsor, CT (US); Wesley K. Lord, South Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 15/619,893

(22) Filed: Jun. 12, 2017

(65) Prior Publication Data

US 2018/0354637 A1 Dec. 13, 2018

(51) Int. Cl.
| | | |
|---|---|---|
| *B64D 27/14* | (2006.01) | |
| *F02K 3/062* | (2006.01) | |
| *F02K 3/072* | (2006.01) | |
| *F02C 7/18* | (2006.01) | |
| *B64D 35/06* | (2006.01) | |
| *B64D 41/00* | (2006.01) | |

(52) U.S. Cl.
CPC ............ *B64D 27/14* (2013.01); *B64D 35/06* (2013.01); *F02C 7/18* (2013.01); *F02K 3/062* (2013.01); *F02K 3/072* (2013.01); *B64D 2041/002* (2013.01); *F05D 2220/323* (2013.01); *F05D 2220/50* (2013.01); *F05D 2260/20* (2013.01)

(58) Field of Classification Search
CPC .. B64D 27/14; B64D 27/20; B64D 2027/005; B64D 2033/0226; B64C 1/16; F02K 1/822; F02K 3/062; F02K 3/072
See application file for complete search history.

(56) References Cited

U.S. PATENT DOCUMENTS

| | | | | |
|---|---|---|---|---|
| 2,477,637 | A * | 8/1949 | Mercier | B64C 21/06 244/130 |
| 3,194,516 | A * | 7/1965 | Messerschmitt | B64D 27/20 244/74 |
| 4,809,498 | A * | 3/1989 | Giffin, III | B64C 11/48 416/129 |

(Continued)

FOREIGN PATENT DOCUMENTS

| | | |
|---|---|---|
| EP | 2415965 | 2/2012 |
| EP | 2730501 | 5/2014 |

(Continued)

OTHER PUBLICATIONS

European Search Report for Application No. 18177403.5 dated Sep. 21, 2018.

*Primary Examiner* — Joseph W Sanderson
(74) *Attorney, Agent, or Firm* — Carlson, Gaskey & Olds, P.C.

(57) ABSTRACT

A boundary layer ingestion engine includes a gas generator, a turbine fluidly connected to the gas generator, and a fan mechanically linked to the turbine via at least one shaft. The linkage is configured such that rotation of the turbine is translated to the fan. The boundary layer ingestion engine further includes an exhaust duct fluidly connected to an outlet of the turbine. The exhaust duct is positioned radially inward of the fan.

17 Claims, 3 Drawing Sheets

(56) References Cited

U.S. PATENT DOCUMENTS

| | | | | |
|---|---|---|---|---|
| 5,079,916 A | * | 1/1992 | Johnson | B64C 11/48 416/129 |
| 8,701,381 B2 | * | 4/2014 | Eames | B64C 11/346 60/39.163 |
| 8,708,274 B2 | * | 4/2014 | Lord | B64D 27/14 244/55 |
| 8,845,270 B2 | * | 9/2014 | Nordstrom | B64C 11/02 415/83 |
| 8,876,465 B2 | * | 11/2014 | Stretton | F01D 25/12 415/116 |
| 9,039,567 B2 | * | 5/2015 | Fabre | B64D 35/04 475/331 |
| 9,376,213 B2 | | 6/2016 | Rolt | |
| 9,637,217 B2 | * | 5/2017 | Marrinan | B64C 1/16 |
| 9,701,395 B2 | * | 7/2017 | Veilleux, Jr. | B64C 11/48 |
| 9,815,560 B2 | * | 11/2017 | Marrinan | B64D 29/04 |
| 9,821,917 B2 | * | 11/2017 | Becker | B64C 21/06 |
| 9,957,055 B2 | * | 5/2018 | Marrinan | B64D 27/10 |
| 2011/0268563 A1 | * | 11/2011 | Stretton | F01D 25/12 415/179 |
| 2012/0023898 A1 | * | 2/2012 | Mackie | F01D 1/26 60/39.162 |
| 2012/0063880 A1 | * | 3/2012 | Nordstrom | B64C 11/02 415/1 |
| 2012/0128487 A1 | * | 5/2012 | Eames | B64C 11/346 416/1 |
| 2013/0062463 A1 | * | 3/2013 | Lord | B64D 27/14 244/55 |
| 2013/0174572 A1 | * | 7/2013 | Raison | B64C 7/02 60/782 |
| 2014/0017086 A1 | * | 1/2014 | Charier | B64C 11/308 416/128 |
| 2014/0263824 A1 | * | 9/2014 | Pesyna | B64D 41/00 244/58 |
| 2014/0294585 A1 | * | 10/2014 | Escure | B64C 11/385 416/147 |
| 2015/0291285 A1 | * | 10/2015 | Gallet | F01D 13/02 415/60 |
| 2016/0195012 A1 | * | 7/2016 | Olivier | B64C 11/38 415/122.1 |
| 2016/0207631 A1 | | 7/2016 | Suciu et al. | |
| 2016/0290227 A1 | * | 10/2016 | Lord | B64D 27/14 |
| 2016/0332741 A1 | | 11/2016 | Moxon | |
| 2017/0081035 A1 | | 3/2017 | Becker et al. | |
| 2017/0081036 A1 | | 3/2017 | Marrinan et al. | |
| 2017/0081037 A1 | | 3/2017 | Marrinan et al. | |
| 2017/0101191 A1 | | 4/2017 | Becker et al. | |
| 2017/0121031 A1 | * | 5/2017 | Stieger | B64D 33/02 |
| 2017/0292523 A1 | * | 10/2017 | Niergarth | F04D 25/06 |
| 2017/0361939 A1 | * | 12/2017 | Negulescu | B64D 27/14 |
| 2018/0030852 A1 | * | 2/2018 | Tantot | F01D 21/045 |

FOREIGN PATENT DOCUMENTS

| | | | | |
|---|---|---|---|---|
| FR | 3039213 | | 1/2017 | |
| GB | 2138507 A | * | 10/1984 | B64C 1/16 |
| GB | 2542184 | | 3/2017 | |

* cited by examiner

AFT FAN COUNTER-ROTATING TURBINE ENGINE

TECHNICAL FIELD

The present disclosure relates generally to aft fan gas turbine engines, and more specifically to a configuration for an aft fan boundary layer ingestion engine.

BACKGROUND

Aircraft, such as those utilized by commercial airlines, typically include two or more gas turbine engines mounted in or under the wings of the aircraft. The engines generate thrust, propelling the aircraft forward and allowing operation of the aircraft. A typical engine utilized in this configuration includes a fan forward of a turbine engine core, with the turbine engine core driving the rotation of the fan either via a direct drive system or a geared connection.

During flight, air passing over the fuselage of the aircraft forms a boundary layer immediately adjacent the fuselage due to friction between the air and the fuselage. The boundary layer resists forward motion through the air. In order to overcome the resistance of the boundary layer, the engines are typically oversized relative to a thrust requirement of the aircraft were the boundary layer to not be present.

SUMMARY OF THE INVENTION

An exemplary boundary layer ingestion engine includes a gas generator, a turbine fluidly connected to the gas generator, a fan mechanically linked to the turbine via at least one shaft such that rotation of the turbine is translated to the fan, and an exhaust duct fluidly connected to an outlet of the turbine, wherein the exhaust duct is positioned radially inward of the fan.

In a further example of the previously described boundary layer ingestion engine, the fan is positioned aft of the turbine.

In a further example of any of the previously described boundary layer ingestion engines, the fan includes a first fan and a second fan downstream of the first fan, and wherein the first fan and the second fan are configured to counter rotate.

In a further example of any of the previously described boundary layer ingestion engines, the turbine section includes a first turbine and a second turbine downstream of the first turbine, and wherein the first turbine drives the rotation of the second fan by means of a first shaft of the at least one shaft, and the second turbine drives rotation of the first fan by means of a second shaft of the at least one shaft, and wherein the first shaft and the second shaft are concentric.

In a further example of any of the previously described boundary layer ingestion engines, the first fan and the second fan each have a corresponding rotating tip shroud with a first fan shroud defining a fan inlet and a second fan shroud defining a fan exit nozzle configured to axially straighten airflow exiting the fan.

In a further example of any of the previously described boundary layer ingestion engines, the gas generator is an auxiliary power unit (APU).

In a further example of any of the previously described boundary layer ingestion engines, the APU is configured to operate as a starter-generator in at least one mode of operations.

In a further example of any of the previously described boundary layer ingestion engines, the gas generator is in-line with the turbine.

In a further example of any of the previously described boundary layer ingestion engines, the gas generator is out of line with the turbine.

In a further example of any of the previously described boundary layer ingestion engines, the boundary layer ingestion engine is a tail mounted engine for an aircraft, and wherein said aircraft includes at least two wing mounted engines.

In a further example of any of the previously described boundary layer ingestion engines, an inlet of the gas generator is fluidly connected to a boundary layer separator duct.

In a further example of any of the previously described boundary layer ingestion engines, the boundary layer ingestion engine is mounted aft of an aircraft tail section, and wherein the boundary layer separator duct connects an inlet to the inlet of the gas generator.

In a further example of any of the previously described boundary layer ingestion engines, the engine further includes a static structural frame disposed aft of said turbine and fore of said fan.

In a further example of any of the previously described boundary layer ingestion engines, the static structural frame further includes a cooling air duct connecting a radially outward pressurized cooling air source to a radially inward cooling air system.

In a further example of any of the previously described boundary layer ingestion engines, the engine further includes a cooling passage disposed radially outward of an exhaust duct and radially inward of the fan, the cooling passage being configured to receive cooling air from a pressurized cooling air source.

In a further example of any of the previously described boundary layer ingestion engines, the static structural frame includes at least one airflow correcting vane.

In a further example of any of the previously described boundary layer ingestion engines, the exhaust duct is at least partially defined by a rotating frame.

In a further example of any of the previously described boundary layer ingestion engines, the exhaust duct includes a first rotating frame configured to rotate a first direction and a second rotating frame configured to rotate a second direction, opposite the first direction.

A method for operating an aft fan gas turbine engine includes generating a compressed gas in a gas generator, providing the compressed gas to a turbine, and driving rotation of the turbine via expansion of the compressed gas, driving rotation of a fan, aft of the turbine, via at least one shaft connecting the turbine to the fan, and exhausting expanded gasses from a turbine outlet to an ambient atmosphere through a ducting passing radially inward of the fan.

In a further example of the above method, driving rotation of the turbine includes driving rotation of a first turbine section and a second fan stage in a first direction, and driving rotation of a second turbine section and a first fan stage in a second direction, such that the first turbine section and the second turbine section are counter rotating.

A further example of any of the above methods includes providing a pressurized cooling air flow to a cooling air system radially inward of the fan from a cooling air source through a static structural frame disposed at least partially between the turbine and the fan and providing the pressurized cooling air flow to a cooling passage disposed radially outward of an exhaust duct and radially inward of the fan.

These and other features of the present invention can be best understood from the following specification and drawings, the following of which is a brief description.

DETAILED DESCRIPTION OF AN EMBODIMENT

Figure 1:
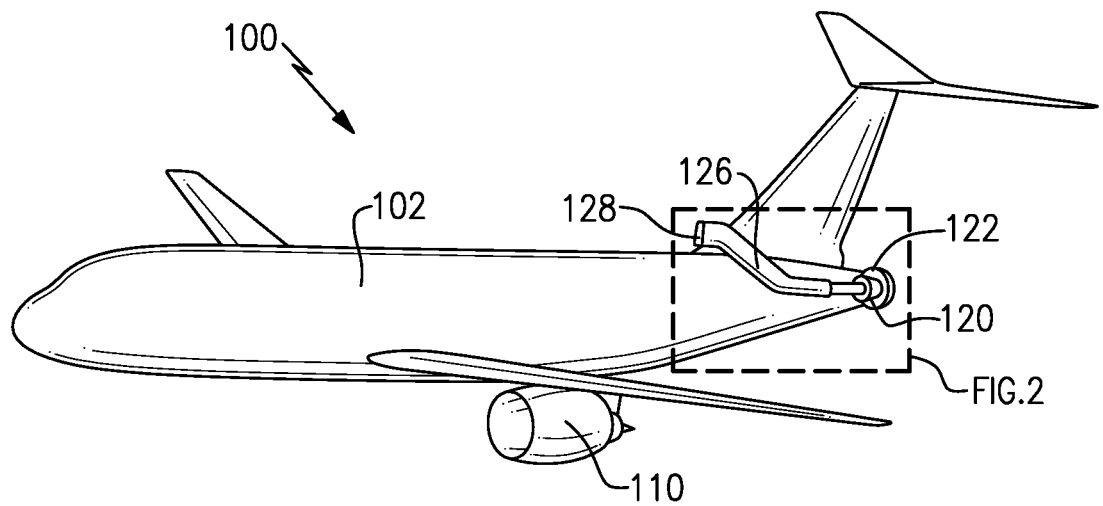
FIG. 1 illustrates an exemplary aircraft including an aft fan gas turbine engine for boundary layer excitation.

FIG. 1 schematically illustrates an exemplary aircraft 100 including two conventional, wing mounted gas turbine engines 110, and a tail mounted aft fan turbine engine 120. During flight operations, such as during a cruise mode of operations, a boundary layer forms along the surface of the fuselage 102. The boundary layer creates drag and resists forward motion of the aircraft 100. Conventional aircrafts size the engines 110 to overcome the boundary layer drag during operation of the aircraft. This oversizing of the engine 110 can result in decreases in the efficiency of the engine operation.

In the example of FIG. 1, the tail mounted engine 120 is an aft fan engine, and includes a fan downstream of a free-turbine. A boundary layer separating inlet 128 is disposed in the tail of the aircraft 100 and ingests air outside of the boundary layer. A boundary layer separator duct 126 provides the ingested air to a gas generator. A fan inlet 122 ingests boundary layer air into a fan duct, thereby energizing the boundary layer. The gas generator generates a compressed gas that is then provided to the free-turbine. The presence of the aft fan engine 120, alternately referred to as a boundary layer ingestion engine, ingests the drag on the fuselage 120 and decreases the thrust requirement of the wing mounted engines 110.

In some examples, the aft fan engine 120 can generate up to 15% of the required thrust power for the aircraft. In such an example, the wing mounted engines 110 can be downsized to a corresponding 85% of the size that would be required absent the aft fan engine 120. In yet further examples, a gas generator, which drives the aft fan, can perform some or all the duties defined as offtakes power extraction to support aircraft operation not directly associated with propulsive thrust generation. Such mechanical shaft horsepower, or bleed extraction from engines 110, can be extracted from the gas generator of the dedicated boundary layer ingestion engine. A generator can be placed on the low spool shaft of the gas generator such that potentially large amounts of electrical power could be extracted without the need to extract that power from the high spool. In some configurations, the APU can operate as a starter-generator for the aircraft 100.

Figure 2:
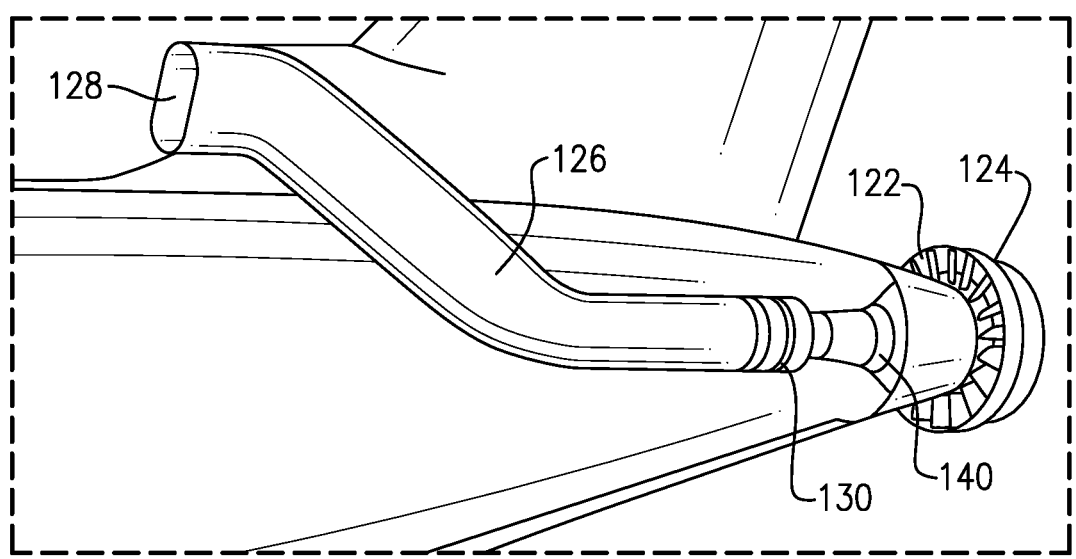
FIG. 2 schematically illustrates a zoomed, partially transparent, view of a tail section of the exemplary aircraft of FIG. 1.

With continued reference to FIG. 1, and with like numerals indicating like elements, FIG. 2 schematically illustrates a zoomed in view of the aft fan engine 120 of FIG. 1. The aft fan engine 120 includes the above described fan inlet 122 configured to ingest a boundary layer, and is encompassed by a rotating aerodynamic fairing 124 or shroud. The gas generator 130 is positioned fore of the fan inlet 122, within the fuselage 102 of the aircraft 100. Compressed gas from the gas generator 130 drives rotation of a free-turbine 140, which in turn drives rotation of the fan (hidden) aft of the turbine 140. Exhaust gasses from the turbine are passed through a duct that is positioned radially inward of a fan duct, and are exhausted into ambient air aft of the boundary layer ingestion engine.

Figure 3:
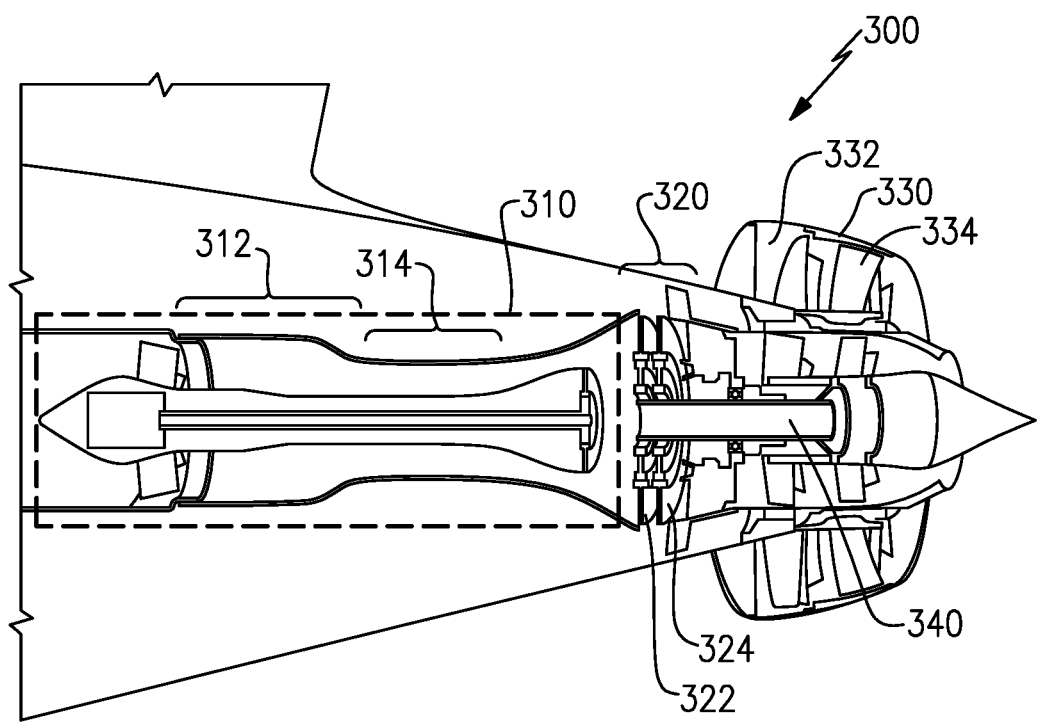
FIG. 3 schematically illustrates an exemplary boundary layer ingestion engine configuration including a gas generator connected to a free-turbine and a fan.

With continued reference to FIG. 1, FIG. 3 schematically illustrates an exemplary boundary layer ingestion engine configuration including a gas generator 310 connected to a free-turbine 320 and a fan 330. The exemplary gas generator 310 includes a compressor 312, and a combustor 314, and a turbine to drive the compressor, which operate according to known gas powered turbine principles to generate a compressed gas.

The compressed gas exits the gas generator 310 and is provided to the free turbine 320. The free turbine 320 includes a first turbine section 322 and a second turbine section 324. Each of the turbine sections includes rotor blades, and the expansion of the compressed gas across the turbine section drives the turbine sections 322, 324 to rotate. In one example, the turbine sections 322, 324, as well as the fan sections 332, 334 (described below), are counter rotating. In other words, the first turbine section 322 rotates in a first direction about an axis defined by the engine, and the second turbine section 324 rotates in a second direction about the axis defined by the engine. While described as a first turbine section 322 and a second turbine section 324, it should be understood that each turbine section 322, 324 can include one or more turbine stages.

The free turbine 320 is connected to a fan 330 via concentric shafts 340. In the illustrated example, the fan 330 includes a first fan section 332 and a second fan section 334. As with the free turbine 320, the first fan section is configured to rotate in a first direction about the axis, and the second fan section is configured to rotate in a second direction, opposite the first direction about the axis. By utilizing counter rotating turbine 320 and a corresponding counter rotating tip-shrouded fan 330, the boundary layer ingestion engine 300 allows airflow through the fan 330 to be straightened without the utilization of an exit guide vane or a static nacelle structure. In an exemplary embodiment, the fan tip speeds are set low enough such that a full ring integral shroud is structurally feasible, and the external windage loss of the rotating shrouds is not a significant performance penalty.

In some examples, the gas generator 310 is mechanically decoupled from the free turbine and can be angled relative to the turbine 320 and the fan 330. In alternative examples, such as the illustrated example, the gas generator 310 can be inline with the turbine 320 and the fan 330.

Figure 4:
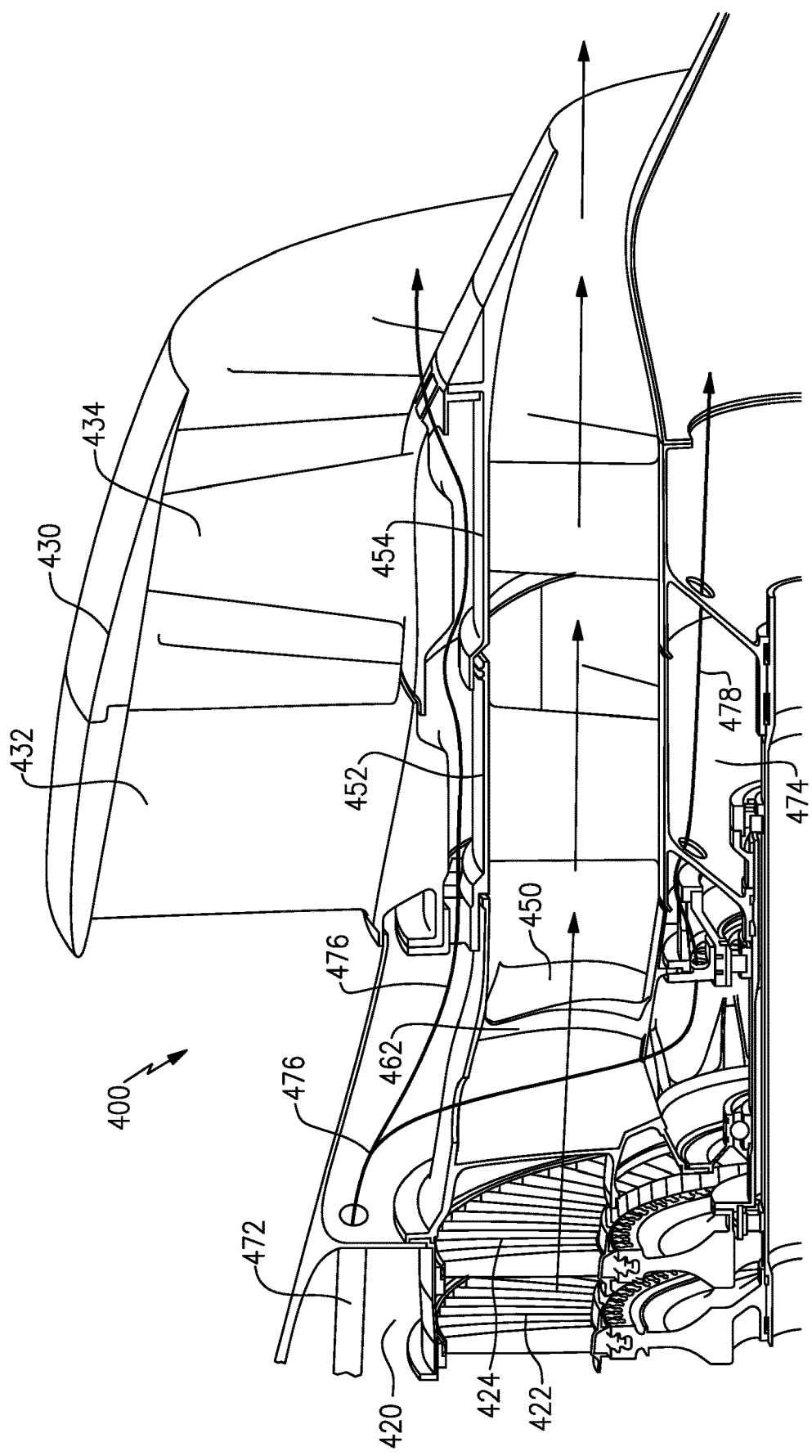
FIG. 4 schematically illustrates a zoomed in partial view of a free turbine and a corresponding fan section of a boundary layer ingestion engine.

With continued reference to FIG. 3, and with like numerals indicating like elements, FIG. 4 schematically illustrates a zoomed in view of a fan 430 and turbine 420 of another exemplary boundary layer ingestion engine 400. Once expanded across the turbine sections 422, 424, the spent turbine gasses are exhausted through a duct 450 that is positioned radially inward of the fan sections 432, 434. The duct 450 is, at least partially, constructed of two rotating frames 452, 454. The rotating frames 452, 454 are mechanically coupled to corresponding fan sections 432, 434 and allow the fan sections 432, 434 to rotate without impacting the ability of the duct to exhaust spent turbine gasses aft of the boundary layer ingestion engine. The rotating frames 452, 454 can be configured according to any known framing configuration. Further, exhaust nozzles for the fan 430 and turbine exhaust from the duct 450 rotate with the second rotating frame 454.

Positioned downstream of the turbine 520, but upstream of the rotation frames 452, 454, is a static structural frame 460. The static structural frame 460 maintains the position and stability of the fan and free turbine sections of the boundary layer ingestion engine 400. In some examples, the static structural frame 460 can include vanes 462 having a flow correcting structure. In yet further examples, a passage can be included within the static structure and allow pressurized cooling air 470 to pass from a cooling air source 472 radially outward of the turbine 420 to a cooling cavity 474 radially inward of the fan 430, through the static structural frame. In the exemplary embodiment, the cooling air 470 passes along two flowpaths 476, 478. The first flowpath 476 passes between the exhaust duct and the fan, while the second flowpath passes through a cooling cavity 474 radially inward of the exhaust duct.

The cooling air in flowpath 476 provides active cooling to the fan hubs, thermally isolating them from the high temperatures of the exhaust duct. The active cooling of the fan hubs reduces the material temperature of the fan components and reduces the chance of buckling, or other thermal stress related damage to the blades. The cooling air in flowpath 478 provides active cooling to the shafts and bearing compartments.

While described herein with specific regards to a boundary layer ingestion engine having counter rotating turbines and counter rotating fans, one of skill in the art will appreciate that the radial inward ducting, and the cooling provided from the radially outward cooling source provide the same benefits, and could be adapted to, any other aft fan turbine engine and are not limited to the specific example described herein.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A boundary layer ingestion engine comprising:
    a gas generator;
    a turbine fluidly connected to the gas generator;
    a fan mechanically linked to the turbine via at least one shaft such that rotation of the turbine is translated to the fan;
    an exhaust duct fluidly connected to an outlet of the turbine, wherein the exhaust duct is positioned radially inward of the fan;
    a static structural frame disposed aft of said turbine and fore of said fan; and
    a cooling passage disposed radially outward of the exhaust duct and radially inward of the fan, and being at least partially defined at a forward end by the static structural frame, and being defined at least partially by a first rotating frame and a second rotating frame.

2. The boundary layer ingestion engine of claim 1, wherein the fan comprises a first fan and a second fan downstream of the first fan, and wherein the first fan and the second fan are configured to counter rotate.

3. The boundary layer ingestion engine of claim 2, wherein the turbine section comprises a first turbine and a second turbine downstream of the first turbine, and wherein the first turbine drives the rotation of the second fan by means of a first shaft of the at least one shaft, and the second turbine drives rotation of the first fan by means of a second shaft of the at least one shaft, and wherein the first shaft and the second shaft are concentric.

4. The boundary layer ingestion engine of claim 2, wherein the first fan and the second fan each have a corresponding rotating tip shroud with a first fan shroud defining a fan inlet and a second fan shroud defining a fan exit nozzle configured to axially straighten airflow exiting the fan.

5. The boundary layer ingestion engine of claim 1, wherein the gas generator is an auxiliary power unit (APU).

6. The boundary layer ingestion engine of claim 5, wherein the APU is configured to operate as a starter-generator in at least one mode of operations.

7. The boundary layer ingestion engine of claim 1, wherein the gas generator is in-line with the turbine.

8. The boundary layer ingestion engine of claim 1, wherein the gas generator is out of line with the turbine.

9. The boundary layer ingestion engine of claim 1, wherein the boundary layer ingestion engine is configured to be a tail mounted engine for an aircraft including at least two wing mounted engines.

10. The boundary layer ingestion engine of claim 1, wherein an inlet of the gas generator is fluidly connected to a boundary layer separator duct.

11. The boundary layer ingestion engine of claim 10, wherein the boundary layer ingestion engine is configured to be mounted aft of an aircraft tail section, and wherein the boundary layer separator duct is configured to connect an inlet to the inlet of the gas generator.

12. The boundary layer ingestion engine of claim 1, wherein the static structural frame further includes a cooling air duct connecting a radially outward pressurized cooling air source to a radially inward cooling air system.

13. The boundary layer ingestion engine of claim 1, wherein the cooling passage is configured to receive cooling air from a pressurized cooling air source.

14. The boundary layer ingestion engine of claim 1, wherein the static structural frame includes at least one airflow correcting vane.

15. The boundary layer ingestion engine of claim 1 wherein the exhaust duct is at least partially defined by the first rotating frame and the second rotating frame.

16. The boundary layer ingestion engine of claim 1, wherein the first rotating frame is configured to rotate a first direction and the second rotating frame is configured to rotate a second direction, opposite the first direction.

17. The boundary layer ingestion engine of claim 1, wherein the first rotating frame is configured to rotate a first direction, and the second rotating frame is configured to rotate a second direction opposite the first direction.

* * * * *